US010336858B2

(12) United States Patent
Gelmont et al.

(10) Patent No.: US 10,336,858 B2
(45) Date of Patent: *Jul. 2, 2019

(54) PREPARATION OF BROMINE-CONTAINING POLYMERS USEFUL AS FLAME RETARDANTS

(71) Applicant: Bromine Compounds Ltd., Beer Sheva (IL)

(72) Inventors: Mark Gelmont, Haifa (IL); Michael Yuzefovich, Haifa (IL); Andrew Piotrowski, Yorktown Heights, NY (US); David Yoffe, Haifa (IL); Ron Frim, Haifa (IL); Yaniv Hirschsohn, Rehovot (IL)

(73) Assignee: Bromine Compounds Ltd., Beer Sheva (IL)

( * ) Notice: Subject to any disclaimer, the term of this patent is extended or adjusted under 35 U.S.C. 154(b) by 152 days.

This patent is subject to a terminal disclaimer.

(21) Appl. No.: 15/323,847

(22) PCT Filed: Jul. 7, 2015

(86) PCT No.: PCT/IL2015/050705
§ 371 (c)(1),
(2) Date: Jan. 4, 2017

(87) PCT Pub. No.: WO2016/005978
PCT Pub. Date: Jan. 14, 2016

(65) Prior Publication Data
US 2017/0145151 A1 May 25, 2017

Related U.S. Application Data

(60) Provisional application No. 62/021,718, filed on Jul. 8, 2014.

(51) Int. Cl.
| C08G 61/02 | (2006.01) |
| C08L 25/06 | (2006.01) |
| C08L 51/04 | (2006.01) |
| C08L 55/02 | (2006.01) |
| C08L 65/00 | (2006.01) |
| C09K 21/14 | (2006.01) |

(52) U.S. Cl.
CPC .............. *C08G 61/02* (2013.01); *C08L 25/06* (2013.01); *C08L 55/02* (2013.01); *C09K 21/14* (2013.01); *C08G 2261/12* (2013.01); *C08G 2261/146* (2013.01); *C08G 2261/148* (2013.01); *C08G 2261/3424* (2013.01); *C08G 2261/45* (2013.01); *C08L 51/04* (2013.01)

(58) Field of Classification Search
CPC ................ C08G 61/02; C08G 2261/12; C08G 2261/146; C08G 2261/148; C08G 2261/3424; C08G 2261/145; C08L 51/04; C08L 25/06; C08L 55/02; C09K 21/14
See application file for complete search history.

(56) References Cited

U.S. PATENT DOCUMENTS

| 3,331,797 A | 7/1967 | Kopetz et al. |
| 3,658,634 A | 4/1972 | Yanagi et al. |
| 3,821,320 A | 6/1974 | Mark et al. |
| 3,899,466 A | 8/1975 | Dubeck et al. |
| 3,962,164 A | 6/1976 | Praetzel et al. |
| 4,119,612 A | 10/1978 | Vollkommer et al. |
| 4,376,837 A | 3/1983 | Jenkner et al. |
| 4,525,513 A | 6/1985 | Hochberg et al. |
| 6,028,156 A | 2/2000 | Peled et al. |
| 6,063,852 A | 5/2000 | Hussain |
| 6,503,988 B1 | 1/2003 | Kitahara et al. |
| 7,601,774 B2 | 10/2009 | Kornberg et al. |
| 7,605,207 B2 | 10/2009 | Oren et al. |
| 9,481,621 B2 | 11/2016 | Gelmont et al. |
| 2005/0043464 A1 | 2/2005 | Pederson |
| 2007/0205403 A1* | 9/2007 | Kornberg ................ C07C 17/12 252/609 |
| 2007/0257241 A1 | 11/2007 | Kornberg et al. |

FOREIGN PATENT DOCUMENTS

| CN | 101511927 A | 8/2009 |
| CN | 101805262 A | 8/2010 |
| DE | 2527802 A1 | 12/1976 |
| DE | 2636027 A1 | 2/1978 |
| DE | 3320333 C1 | 1/1984 |

(Continued)

OTHER PUBLICATIONS

Office Action in CN Application No. 201580035499.2 dated Jun. 1, 2018, 4 pages.

(Continued)

*Primary Examiner* — Shane Fang
(74) *Attorney, Agent, or Firm* — Marshall, Gerstein & Borun LLP

(57) ABSTRACT

The invention relates to a process for preparing bromine-containing polymer, comprising a Friedel-Crafts alkylation reaction of tetrabromoxylylene dihalide, or tetrabromoxylylene dihalide in combination with pentabromobenzyl halide, with a reactant having one or more six-membered aromatic rings, wherein the reaction takes place in a solvent in the presence of a Friedel-Crafts catalyst, and isolating from the reaction mixture the bromine-containing polymer. The so-formed polymers and their use as flame retardants form additional aspects of the invention.

6 Claims, No Drawings

(56) References Cited

FOREIGN PATENT DOCUMENTS

| EP | 0047866 A1 | 3/1982 |
| EP | 0305196 A2 | 3/1989 |
| EP | 0481126 A2 | 4/1992 |
| JP | 47032298 | 8/1972 |
| WO | WO-2006/013554 A1 | 2/2006 |
| WO | WO-2012/127463 A1 | 9/2012 |
| WO | WO-2013/054325 A1 | 4/2013 |
| WO | WO-2014/061010 A1 | 4/2014 |
| WO | WO-2016/005973 A1 | 1/2016 |

OTHER PUBLICATIONS

Search Report for International application No. PCT/IL2015/050705 dated Oct. 26, 2015.
Written Opinion for International application No. PCT/IL2015/050705 dated Oct. 26, 2015.
U.S. Appl. No. 15/284,596, filed Oct. 4, 2016.

\* cited by examiner

PREPARATION OF BROMINE-CONTAINING POLYMERS USEFUL AS FLAME RETARDANTS

Brominated compounds are known to be highly effective as flame retardants, and in many cases they constitute the only possible option for reducing the fire risk of synthetic materials. It is postulated that the higher the molecular weight of the brominated flame retardant, the lower is its volatility and its ability to bio-accumulate in living tissues. Therefore, there exists a need to develop high molecular polymeric brominated flame retardants.

The present invention relates to a class of polymers with a bromine-containing repeat unit along the polymer chain, and with bromine-containing side groups. The repeat unit of the polymer comprises at least one of the three isomers depicted below:

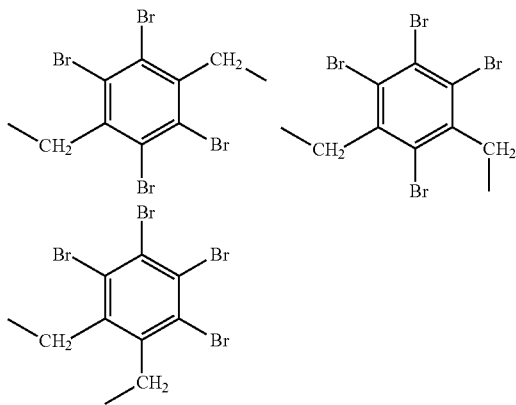

(also identified herein by the chemical formula —$CH_2C_6Br_4CH_2$—). The structural units depicted above are obtained from corresponding di-halide difunctional monomers, i.e., $HalCH_2C_6Br_4CH_2Hal$ (tetrabromoxylylene dihalide), where Hal independently indicates halogen atom such as chlorine or bromine.

The polymers of the invention further contain side groups consisting of pentabromobenzyl groups. Hereinafter, the pentabromobenzyl group is sometimes described by means of its molecular formula —$CH_2C_6Br_5$ or its molecular structure:

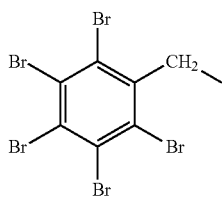

In EP 305196, there is reported the preparation of bromine-rich compounds by the reaction of the aforementioned difunctional monomer $HalCH_2C_6Br_4CH_2Hal$ with a trifunctional monomer which is 2,4,6-trihydroxy-s-triazine, known as (iso)cyanuric acid, in the presence of pentabromobenzyl bromide. More specifically, Example 5 of EP 305195 describes the dissolution of a mixture consisting of 0.3 mol tetrabromoxlilydene dibromide and 0.3 mol pentabromobenzyl bromide in dimethylformamide (DMF), followed by the addition of the trisodium salt of (iso)cyanuric acid (0.2 mol). The thermal stability of the so-formed polymer was characterized by means of thermogravimetric analysis (TGA), which measures the weight loss of a sample as sample temperature is increased (in air, at heating rate of 10° C./minute). The data set out in Example 5 of EP 305196 is tabulated below:

TABLE A

| | temperature | | |
|---|---|---|---|
| | T1 = 275° C. | T2 = 337° C. | T3 = 375° C. |
| % weight loss | 2.0 | 5.0 | 10.0 |

It is seen that the thermal stability of the polymer product of Example 5 of EP 305196 is not entirely satisfactory.

We have now found a synthetic route for incorporating into a polymer structure, the bromine-containing group —$CH_2C_6Br_4CH_2$—, preferably together with the —$CH_2C_6Br_5$ group, thereby forming bromine-rich polymers displaying good thermal stability. The synthetic route involves electrophilic C-alkylation of aromatic rings with the bi-functional compound $HalCH_2C_6Br_4CH_2Hal$, in the presence of a Friedel-Crafts catalyst, to form polymer chain (s). An Addition of $HalCH_2C_6Br_5$ to the reaction mixture, either simultaneously with, or consecutively to, the addition of $HalCH_2C_6Br_4CH_2Hal$, results in the introduction of the —$CH_2C_6Br_5$ as side groups onto the aromatic rings in the polymer chain(s), increasing the bromine content of the product. The so-formed polymers of the invention, which contain the pentabromobenzyl and tetrabromoxylylene groups, have high molecular weight (>3000), their bromine content is preferably not less than 70%, they are insoluble in water and are also quite stable against hydrolysis and/or decomposition.

Accordingly, the present invention provides a novel class of polymers, with —$CH_2C_6Br_4CH_2$— and A units arranged alternately along the polymer backbone chain:

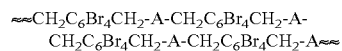

wherein A consists of one or more six-membered aromatic rings (the wavy lines indicate the extension of the polymer chain). Preferably, there are additionally —$CH_2C_6Br_5$ side groups attached to at least a portion of the six-membered aromatic rings of the backbone chain.

The growth of the polymer backbone chain occurs by the formation of a bond between one aliphatic carbon of a —$CH_2C_6Br_4CH_2$— unit and a carbon atom of an aromatic ring of a first A unit, and an additional bond, between the second aliphatic carbon atom of the same —$CH_2C_6Br_4CH_2$— unit, and a carbon atom of an aromatic ring of a second A unit, and so forth. Likewise, a bond is formed between a carbon atom of an aromatic ring and an aliphatic (benzylic) carbon of the —$CH_2C_6Br_5$ group, to afford the side groups. Hereinafter, the term 'pendent groups' indicates the —$CH_2C_6Br_5$ groups bonded to the aromatic rings of the polymer chain.

It should be noted that the polymers of the invention are not necessarily linear, as three —$CH_2C_6Br_4CH_2$— groups may become bonded to the same A unit, to produce a branched polymer. In each of the branches of the polymer, —$CH_2C_6Br_4CH_2$— and A units are arranged alternately along the branch, preferably with pendent —$CH_2C_6Br_5$.

The compounds of the inventions are therefore composed of chains described by the following formula P:

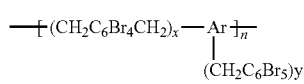

wherein n is the number of repeat units (e.g., 3<n<300); Ar indicates a structure comprising one or more six-membered aromatic ring(s), characterized in that at least one carbon atom of said six membered aromatic ring(s) is bonded to a methylene carbon of the —CH$_2$C$_6$Br$_4$CH$_2$— group; where x, which indicates the number of —CH$_2$C$_6$Br$_4$CH$_2$— moieties in the unit, is equal to or greater than 1; and y, which indicates the number of —CH$_2$C$_6$Br$_5$ pendent groups in the repeat unit, is equal to or greater than 0.

Preferably, Ar contains one six-membered aromatic ring, or two, preferably non-fused, six-membered aromatic rings, and y is at least equal to the number of the aromatic rings in Ar, e.g., y is 1, 2, 3, or 4. For example, is Ar contains one aromatic ring, then the number of —CH$_2$C$_6$Br$_5$ pendent groups would preferably be 1 or 2. If Ar contains two aromatic rings, then the number of the —CH$_2$C$_6$Br$_5$ pendent groups would preferably be 3 or 4. It should be noted that each of the six-membered aromatic ring(s) of which Ar is composed may be substituted, e.g., by alkyl group(s). When Ar consists of two six-membered aromatic rings, then these rings may be either connected by bridges selected from the group consisting of alkylene chains, —O— or —S—, or said rings may be directly joined to each other by a single bond.

More specifically, the present invention provides a novel high molecular weight polymer compound having chains with repeat units represented by Formula (I), and/or a mixture of such compounds:

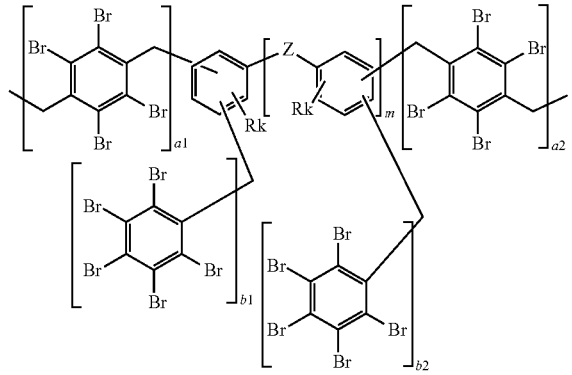

In formula (I), R is a linear or branched aliphatic chain; k is an integer from 0 to 3; a$_1$ and a$_2$ are independently an integer from 1 to 3, preferably 1; b$_1$ and b$_2$ are independently an integer from 1 to 3, preferably 1 or 2; m is 0 or 1; a$_1$+b$_1$≤3 and a$_2$+b$_2$≤3, such that a$_1$+m·a$_2$ equals x (Formula P), and b$_1$+m·b$_2$ equals y (Formula P); Z is selected from the group consisting of null, O, S and a linear or branched alkylene, e.g., an alkylene group containing 1 to 10 carbon atoms.

The compounds of the invention are prepared by reacting a tetrabromoxylylene dihalide [HalCH$_2$C$_6$Br$_4$CH$_2$Hal] either alone or in combination with pentabromobenzyl halide [HalCH$_2$C$_6$Br$_5$], with a starting material which comprises at least one six-membered aromatic ring, as set out above, in the presence of a Friedel-Crafts catalyst (Lewis acids) such as AlCl$_3$, AlBr$_3$, GaCl$_3$, FeCl$_3$, SnCl$_4$, SbCl$_3$, ZnCl$_2$, CuCl$_2$ and HF, preferably AlCl$_3$.

Thus, the invention relates to a process for preparing bromine-containing polymer, comprising a Friedel-Crafts alkylation reaction of tetrabromoxylylene dihalide, or a combination of tetrabromoxylylene dihalide and pentabromobenzyl halide, with a reactant having one or more six-membered aromatic rings in a solvent, in the presence of a Friedel-Crafts catalyst, and isolating bromine-containing polymer from the reaction mixture.

The preferred tetrabromoxylylene dihalide for use in the invention is tetrabromo-para-xylylene dihalide, especially tetrabromo-para-xylylene dibromide (chemically named α,α'-(dibromomethyl)-2,3,5,6-tetrabromoxylene, abbreviated herein TBX-DB). The compound is commercially available from ICL-IP and Aces Pharma Inc. TBX-DB can be produced according to the route of synthesis involving the aromatic bromination of para-xylene, for example in halogenated solvent(s), using elemental bromine, in the presence of a Lewis acid catalyst, e.g. AlCl$_3$, to form tetrabromoxylene, which is then brominated at the benzylic carbons using elemental bromine and a radical source e.g. azobisisobutyronitrile, as illustrated by the scheme:

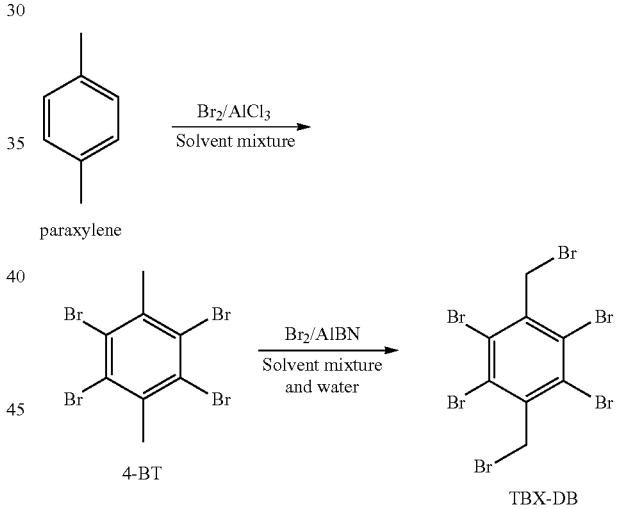

According to U.S. Pat. No. 3,899,466, the other isomers, tetrabromo-meta-xylylene dibromide and tetrabromo-ortho-xylylene dibromide, are prepared by the same process.

The preferred pentabromobenzyl halide for use in the invention is pentabromobenzyl bromide (chemically named 1-(bromomethyl)-2,3,4,5,6-pentabromobenzene and abbreviated herein PBBBr). It is commercially available from ICL-IP, or can be prepared by methods known in the art (e.g., U.S. Pat. No. 6,028,156 and U.S. Pat. No. 7,601,774), according to the route of synthesis involving the aromatic bromination of toluene, for example in halogenated solvent (s), using elemental bromine, in the presence of a Lewis acid catalyst, e.g. AlCl$_3$, to form pentabromotoluene (abbreviated herein 5-BT), which is then brominated at the benzylic carbon using elemental bromine and a radical source e.g. azobisisobutyronitrile, as illustrated by the following scheme (see U.S. Pat. No. 7,601,774):

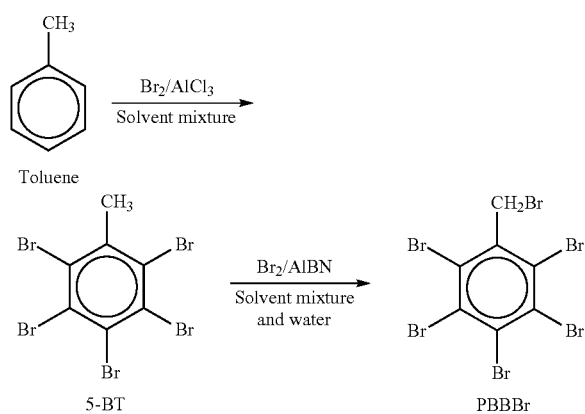

Regarding the preferred starting material which undergoes the aromatic substitution reaction, namely, the electrophilic C-alkylation, it contains one six-membered aromatic ring, or two, preferably non-fused, six-membered aromatic rings. Preferably, this reactant is represented by Formula (II):

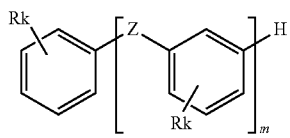

In formula (II) R is a linear or branched aliphatic chain; k is an integer from 0 to 3; m is 0 or 1; Z is selected from the group consisting of null, O, S and a linear or branched alkylene, e.g., an alkylene group containing 1 to 10 carbon atoms.

Exemplary starting materials of Formula II include:
Toluene, where R=$CH_3$, k=1, m=0;
Xylene, where R=$CH_3$, k=2, m=0;
Ethylbenzene, where R=$C_2H_5$, k=1, m=0;
Diphenyl ether, where k=0, Z=O, m=1;
Diphenylmethane, where k=0, Z=—$CH_2$—, m=1; and
1,2-Diphenylethane, where k=0, Z=—$(CH_2)_2$—, m=1.

The Friedel-Crafts alkylation reaction according to the invention takes place in a solvent or a mixture of solvents, e.g., in a halogenated aliphatic hydrocarbon which is preferably selected from the group consisting of dichloromethane (DCM), dibromomethane (DBM), bromochloromethane and dichloroethane (DCE). The molar ratio between the three reactants is suitably adjusted to satisfy the desired degree of substitution on the six-membered aromatic ring(s) and the length of the polymer chain. In general, it is desired to attach not less than one —$CH_2C_6Br_4CH_2$— group, and preferably two —$CH_2C_6Br_5$ groups to each six-membered aromatic ring present in the starting material. The amount of catalyst, e.g., $AlCl_3$, is preferably between 0.5% wt/wt and 2% wt/wt relative to the amount of PBBBr. The reaction is carried out under anhydrous conditions.

When $HalCH_2C_6Br_4CH_2Hal$ (e.g., TBX-DB) is used as the sole alkylating reagent to produce polymers devoid of pendent groups, then the reaction is accomplished by dissolving the aromatic starting material and TBX-DB in the solvent under heating, followed by addition of the catalyst. If both $HalCH_2C_6Br_4CH_2Hal$ and $HalCH_2C_6Br_5$ (e.g. TBX-DB and PBBBr, respectively) are used in the Friedel-Crafts alkylation reaction, then said two alkylating reagents may be fed to the reaction vessel either simultaneously or successively. A simultaneous mode of addition would normally lead to the formation of a polymer dominated by a linear skeletal structure. A successive mode of addition, wherein the feeding of $HalCH_2C_6Br_5$ is initiated only after an added amount of the starting material of Formula II had been at least partially consumed by a reaction with $HalCH_2C_6Br_4CH_2Hal$, would lead to the formation of branched polymers. For example, one convenient way of putting the successive feeding mode into practice involves charging a reaction vessel with the starting material of Formula II and $HalCH_2C_6Br_4CH_2Hal$, and on disappearance of said $HalCH_2C_6Br_4CH_2Hal$, adding $HalCH_2C_6Br_5$, or a mixture of $HalCH_2C_6Br_4CH_2Hal$ and $HalCH_2C_6Br_5$.

Irrespective of the mode of addition of the reactants, the reaction is allowed to reach completion at a temperature in the range from 40° C.-90° C. In general, the reaction time is from 2 to 8 hours. The Friedel-Crafts alkylation reaction is accompanied by the generation of hydrogen bromide. The end of the reaction is indicated by the complete consumption of the either PBBBr, TBX-DB or both. Their disappearance may be determined either by gas chromatography analysis or by the cessation of hydrogen bromide evolution.

The product is isolated from the reaction mixture by means of conventional techniques. The reaction mixture is repeatedly washed with aqueous sodium bisulfite (SBS) solution and water, whereby the excess catalyst is destroyed. The polymer product is virtually insoluble in some of the solvents used, for example in DCE, and precipitates almost instantly from the liquid reaction mass. The solid is then separated from the liquid phase by filtration. However, if the formed product is soluble, at least to some extent, in the reaction solvent, (for example, in DBM), then it is caused to precipitate by the addition of a non-solvent, i.e., a solvent in which the product is essentially insoluble. For example, a lower alcohol such as isopropanol, which is miscible with the halogenated reaction solvent, is useful as a non-solvent for precipitating the product. The isolated product can then be heated in dichloromethane under stirring for at least one hour. The slurry is cooled and the solid product is collected by filtration, and optionally washed and dried.

The invention also relates to the use of $HalCH_2C_6Br_4CH_2Hal$ and $HalCH_2C_6Br_5$ (e.g. TBX-DB and PBBBr, respectively) as alkylation reagents in the Friedel-Crafts alkylation of the compounds of Formula II. In a preferred embodiment, the invention provides a process comprising charging a reaction vessel with a solvent (e.g., halogenated aliphatic hydrocarbon), a starting material of Formula II (e.g., toluene or 1,2-diphenylethane), the combination of $HalCH_2C_6Br_4CH_2Hal$ and $HalCH_2C_6Br_5$, reacting same in the presence of a catalyst (e.g. aluminum chloride) and recovering a Friedel-Crafts alkylation product.

In one preferred class of the polymer compounds of the invention of Formula P, Ar is toluene. This class of compounds is more specifically represented by Formula I, where m=0, R is $CH_3$ and k is 1, especially a polymer with repeat units of Formula I with a1=b1=1. Therefore, the invention preferably provides polymers with chains represented by Formula III (where n is the number of repeat units; e.g., 3<n<300):

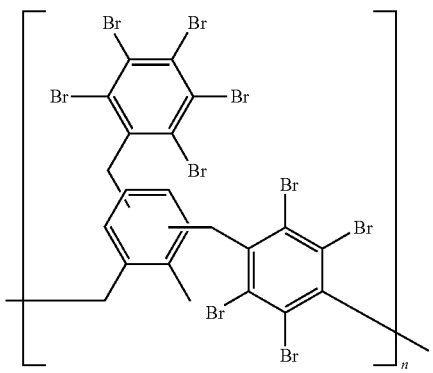

III

The polymer of Formula III is prepared by the Friedel-Crafts alkylation reaction depicted below, where the aromatic starting material is toluene:

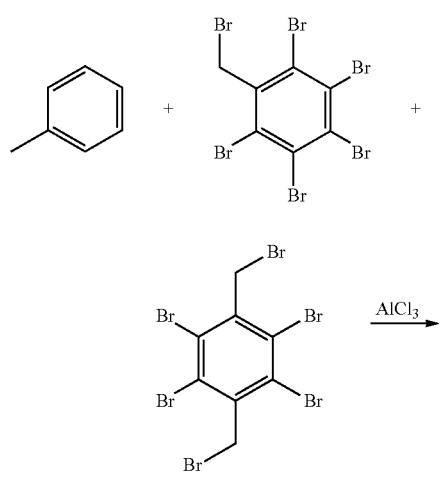

In another preferred class of polymer compounds of the invention of Formula P, Ar is selected from the group consisting of diphenylether, diphenylmethane and 1,2-diphenylethane; this class of compounds is represented by Formula I, wherein k=0 and m=1. Therefore, the invention preferably provides polymers with chains having repaet units represented by Formula IV:

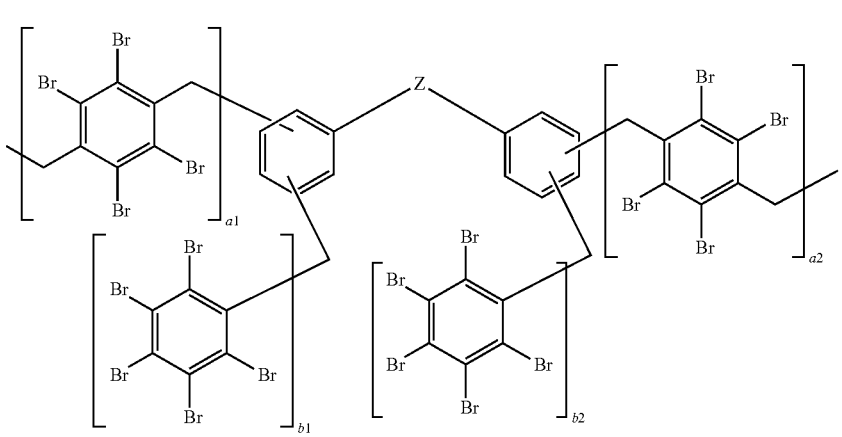

IV wherein Z is selected from the group consisting of O, —CH$_2$—, and —CH$_2$—CH$_2$—, said compounds having bonds between carbon atoms of the aromatic rings of the diphenyloxide or diphenylalkane moieties and the aliphatic carbon of the —CH$_2$C$_6$Br$_4$CH$_2$— group, with a1 and a2 being independently either 1, 2 or 3 (preferably each of a1 and a2 equals 1); and also with the aliphatic (benzylic) carbon of the —CH$_2$C$_6$Br$_5$ group, with b1 and b2 being independently 0, 1 or 2, (preferably each of b1 and b2 equals 2). The bromine content of the compound is preferably not less than 60%, e.g., in the range from 60 to 75%. Bromine content of the product is measured by the Parr Bomb method, involving the decomposition of bromine-containing organic compounds to give bromides, followed by argentometric titration, as described further below.

More preferred are compounds of Formula IV wherein z is —CH$_2$—CH$_2$—, having a bromine content of not less than 66% by weight (if b1=b2=0), e.g., in the range from 66 to 75% by weight (the upper limit corresponds to b1=b2=2), especially the polymer with b1=b2=2. Preferably, the invention provides polymers with chains represented by Formula V (where n is the number of repeat units; 3<n<300):

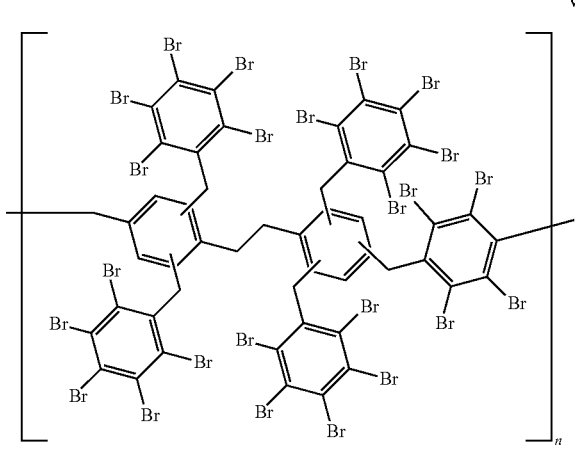

The polymer of Formula V is prepared by the Friedel-Crafts alkylation reaction depicted below:

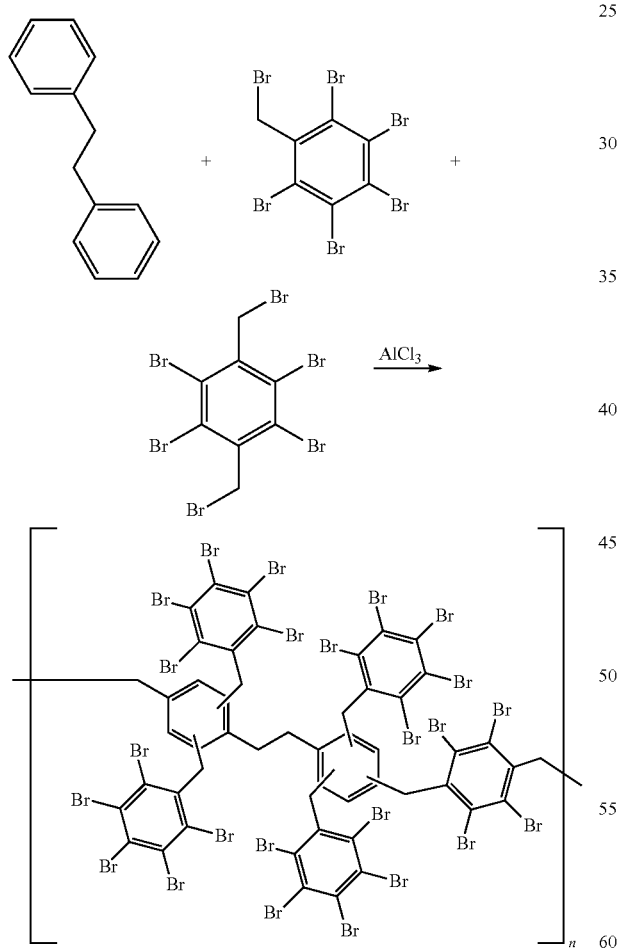

The thermal stability profile of preferred polymers of the invention, as indicated by thermogravimetric analysis (TGA), which measures the weight loss of a sample as sample temperature is increased (in nitrogen, at heating rate of 10° C/minute), is typically as follows:

| | temperature | | |
|---|---|---|---|
| | T1 ≥330° C. | T2 ≥360° C. | T3 ≥380° C. |
| % weight loss | 2.0 | 5.0 | 10.0 |

The bromine-rich polymers of the invention are useful as flame retardant agents in a flammable material. Accordingly, another aspect of the present invention is a flame-retarded formulation which comprises a flammable material and the novel polymer of the invention. For example, the bromine-containing polymers of the invention are especially useful for reducing the flammability of styrene-containing polymers such as high impact polystyrene (HIPS) and acrylonitrile-butadiene-styrene copolymer (ABS).

A flame-retarded formulation of the invention comprises an effective flame-retarding amount of the novel bromine-containing polymer of the invention, e.g., the compounds of Formula I, especially of Formulas III and V. The concentration the bromine-containing polymer of the invention in the plastic formulation is adjusted to secure a bromine content of least 5 wt %, and preferably at least 10 wt %, e.g., from 5 to 15 wt % (relative to the total weight of the plastic formulation).

Other conventional additives may also be included in the formulation. For example, an inorganic compound (typically a metal oxide) capable of cooperating with the novel bromine-containing polymer is preferably also incorporated into the formulation. A preferred example of a suitable inorganic compound, which is generally considered as an "inorganic synergist", is antimony trioxide.

Additionally, the polymer formulation of this invention may contain lubricants, antioxidants (e.g., of a hindered phenol or phosphite type), pigments, UV stabilizers and heat stabilizers. The concentration of each of the conventional additives listed above is typically in the range between 0.05 and 10 wt %.

The plastic formulations which are flame-retarded with the aid of the compounds of the invention are readily prepared by methods known in the art. The various ingredients of the formulation are blended together, according to their respective amounts. The ingredients may be first dry blended using suitable mixing machines, such as Henschel mixer. The resulting mixture may then be processed and compounded to form homogeneous pellets, for example, by using a twin screw extruder. The pellets obtained are dried, and are suitable for feed to an article shaping process such as injection molding. Other blending and shaping techniques can also be applied. Articles molded from the polymer formulations form another aspect of the invention.

For example, the polymer of Formula III:

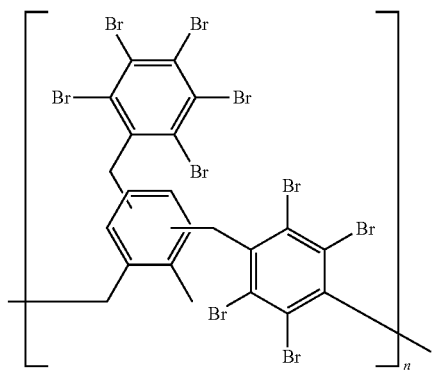

has been successfully added at a fairly reasonable amount to HIPS to achieve UL-94 V-0 rating. Accordingly, a specific aspect of the invention is HIPS composition comprising HIPS resin and bromine-containing polymer of Formula I, especially of Formula III. HIPS resins suitable for use in the invention are the rubber-modified copolymers or homopolymers of styrenic monomers, obtainable, for example, by mixing an elastomer (butadiene) with the (optionally substituted) styrenic monomer(s) prior to polymerization. Characteristics and compositions of HIPS are described, for example, in "Encyclopedia of Polymer Science and Engineering", Volume 16, pages 88-96 (1985). The HIPS formulations provided by the invention generally comprise not less than 50 wt % HIPS resin, e.g., between 50 and 95 wt %, and preferably between 70 and 90 wt % HIPS resins (such as HIPS resins having a melt flow index (MFI) between 1 and 50 g/10 min (ISO 1133; 200° C./5 kg)). HIPS resins which are suitable for use according to the invention are commercially available from various manufacturers, for example Dow Styron® or INEOSNOVA Empera.

The HIPS formulation according to the present invention further comprises from 10 to 20% by weight (for example, from 12 to 18%) of the bromine-containing flame retardant of Formula I (e.g., of Formula III), from 1.0 to 5.0% by weight (for example, from 1.5 to 2.5%) antimony trioxide and one or more anti-dripping agents such as polytetrafluoroethylene (abbreviated PTFE) in a preferred amount between 0.025 and 0.4 wt %, more preferably between 0.025 and 0.3 wt %, and even more preferably between 0.05 and 0.2 wt %. PTFE is described, for example, in U.S. Pat. No. 6,503,988.

In yet another embodiment of the invention, the polymer of Formula V:

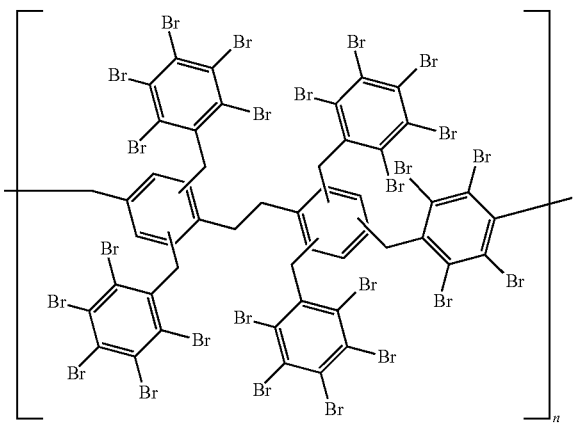

has been successfully used to reduce the flammability of ABS (with the aid of antimony trioxide). ABS compositions of the invention preferably comprise not less than 50 wt % ABS (relative to the total weight of the formulation), e.g., from 50 to 85 wt % ABS. The term ABS refers in the context of the present invention to copolymers and terpolymers that include the structural units corresponding to (optionally substituted) styrene, acrylonitrile and butadiene, regardless of the composition and method of production of said polymers. Characteristics and compositions of ABS are described, for example, in the Encyclopedia of Polymer Science and Engineering, Volume 16, pages 72-74 (1985). ABS with MFI between 1 and 50 g/10 min (measured according to ISO 1133 at 220° C./10 kg) are used.

The ABS formulation according to the present invention also comprises from 5 to 20% by weight (for example, from 10 to 18%) of the bromine-containing flame retardant of Formula I (e.g., of Formula V), from 1.0 to 6.0% by weight antimony trioxide (for example, from 1.5 to 5.0%) and one or more anti-dripping agents such as PTFE in a preferred amount between 0.025 and 0.4 wt %, more preferably between 0.025 and 0.3 wt %, and even more preferably between 0.05 and 0.2 wt %.

Polypropylene formulation of the invention preferably comprises a polypropylene copolymer in an amount of not less than 50 wt % (relative to the total weight of the formulation), e.g., from 50 to 85 wt %. Suitable polypropylene impact copolymers which can be used in the present invention can be in the form of block copolymers comprising a first block (or phase), which is essentially the polypropylene homopolymer component and a second block (or phase), which is an ethylene-propylene copolymer component. A polypropylene impact copolymer is produced by means of sequential polymerization reactions under conditions known in the art. The first reaction produces the homopolymer component and the second reaction produces the copolymer component. Thus, the copolymer component is chemically incorporated within the matrix of the homopolymer component. Different grades of polypropylene impact copolymers in the form of block copolymers are commercially available (Carmel Olefins, Israel, under the name Capilene® SE 50E, TR 50 and SL 50). Impact modified polypropylenes can be prepared by admixing a polypropylene homopolymer and a rubber. The compounds of the invention can be used to reduce the flammability of either filler-free or filler-containing polypropylene-based formulations.

Polyamide-based formulation of the invention comprises at least 30% polyamide, e.g., between 40% and 70% wt %. The polyamide formulation further comprises reinforcing fillers, namely, glass fibers, which are typically pre-coated prior to their use by methods known in the art in order to improve their compatibility with the polyamide matrix. Such modified forms of glass fibers are available in the market, e.g., GF Chop Vantage 3660 from PPG. The glass fibers comprise filaments with diameters in the range from 2μ to 20μ, and are applied in the form of pieces with lengths in the range from 2 to 10 mm, e.g., from 3 to 4.5 mm. For example, the major constituents of glass fibers applied for reinforcing polyamide are alumino-borosilicates; such a type of glass is known as E-glass. The concentration of the glass fibers is from 5% to 40% of the total weight of the polyamide composition.

The polyamide compositions are produced by melt-mixing the components, e.g., in a co-kneader or twin screw extruder, wherein the mixing temperature is in the range from 200 to 300° C. For example, the polyamide, the bromine containing flame retardant and the conventional additives (with the exception of the glass fibers) are dry blended and the blend is fed to the extruder throat. The glass fibers are the last to be added, i.e., downstream.

Articles molded from the polymer formulations which are flame retarded with the bromine-containing polymers form another aspect of the invention.

EXAMPLES

Methods

TGA Analysis:

The TGA analysis was performed by a Mettler-toledo instrument model 850. ~10 mg sample were heated in aluminum oxide crucible from 35 to about 700° C. with heating rate of 10° C./min in nitrogen atmosphere.

Bromine Content:

Bromine content of the compounds is measured by the Parr Bomb method. The sample (~0.08-0.12 g) is placed in a peroxide bomb vessel. Sucrose (0.5 g) is added and the full dipper of sodium peroxide is also added. The sample is subjected to oxidizing with sodium peroxide while a burner flame is applied to the bottom of the bomb; the bomb is heated up to about 200° C. and the burner is then turned off. The bomb is placed in cold water (2 liters). Gaseous products are absorbed by the alkaline mixture and are retained within the bomb, mostly in the form of sodium bromide. The content of the bomb is then combined with warm water. Hydrazine sulfate is added to destroy residual sodium peroxide. Nitric acid is added in portions, until the solution is completely neutralized and becomes acidic. The solution is cooled to room temperature and then subjected to titration with $AgNO_3$ (0.1 N) to determine bromine content.

Example 1

Reaction of Toluene with PBBBr and TBX-DB

DCE (300 ml), PBBBr (84.8 g, 0.15 mol), TBX-DB (66.1 g, 0.114 mol), and toluene (13.8 g, 0.15 mol) were placed in a 500 ml reactor fitted with a mechanical stirrer, thermometer, condenser, HBr trap and N2 inlet. The mixture was heated to 60° C. $AlCl_3$ (1.3 g, 0.01 mol) was added by portions and the vigorous formation of HBr started. The mixture was kept at 60° C. for 2-4 hours until the PBBBr and TBX-DB disappeared (detected by GC and HBr evolution). The reaction mixture was washed three times with water (3×300 ml) and an aqueous solution of $NaHCO_3$, taking 30 minutes for each washing. The reaction mixture was cooled to 50° C. and the solid was filtered off and dried in an oven at 150° C. under reduced pressure for 24 hours, giving 131.3 g, corresponding to an ~98% yield. The content of bromine was about 70%.

The TGA profile of the so-formed product is tabulated below:

| | Temperature | | |
|---|---|---|---|
| | T1 = 360° C. | T2 = 398° C. | T3 = 415° C. |
| % weight loss | 2.0 | 5.0 | 10.0 |

Example 2

Reaction of Ttoluene with PBBBr and TBX-DB

The procedure of Example 1 was repeated, but a solution of DCE (35 ml) and toluene was added dropwise over 1.5 h. The weight of the product was 132.5 g, corresponding to ~99% yield. The content of bromine was about 69.0%.

Example 3

Reaction of Toluene with PBBBr and TBX-DB

The procedure of Example 1 was repeated, using DBM (1.25 l) instead of DCE, PBBBr (424.1 g, 0.75 mol), TBX-DB (312.9 g, 0.54 mol), toluene (69.1 g, 0.75 mol), and $AlCl_3$ (1.3 g, 0.01 mol). After washing, the suspension of the product was added dropwise to IPA (iso-propyl alcohol) (3.5 l), stirred at 20° C. for 30 min and the product was filtered off. The weight of the dried product was 642.0 g, corresponding to ~97% yield. The content of bromine was about 72%.

Example 4

Reaction of Toluene with PBBBr and TBX-DB

The procedure of Example 1 was repeated using DBM (250 ml) instead of DCE, PBBBr (84.8 g, 0.15 mol), TBX-DB (62.6 g, 0.108 mol), toluene (13.9 g, 0.15 mol), and $AlCl_3$ (0.8 g, 0.006 mol). The PBBBr was added after the added TBX-DB had disappeared (about 1.5 h). After washing, the suspension of the product was added dropwise to IPA (700 ml), stirred at 20° C. for 30 min and the product was filtered off. The weight of the product was 127.8 g, corresponding to ~96% yield. The content of bromine was about 71%.

Example 5

Reaction of Diphenylethane with PBBBr and TBX-DB

The procedure of Example 1 was repeated, but using DBM (250 ml) instead of DCE, diphenylethane instead of toluene (9.1 g, 0.05 mol), PBBBr (113.1 g, 0.2 mol), TBX-DB (20.3 g, 0.035 mol), and $AlCl_3$ (0.8 g, 0.006 mol). After washing, the suspension of the product was added dropwise to IPA (1000 ml), stirred at 20° C. for 30 min and the product was filtered off. The weight of the product was 114.8 g, corresponding to ~94% yield. The content of bromine was about 75%. In view of the bromine content, the product is assigned with the following structure:

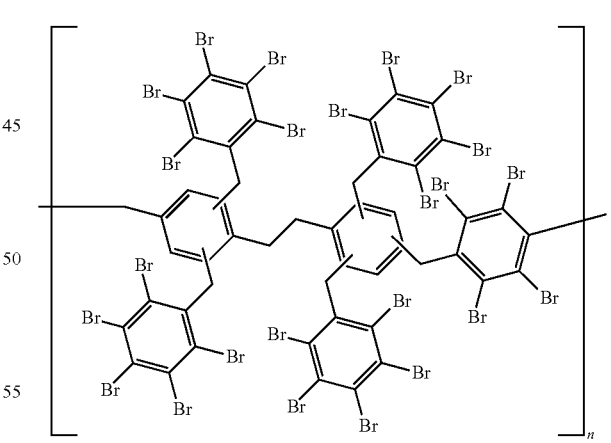

The TGA profile of the product is tabulated below:

| | Temperature | | |
|---|---|---|---|
| | T1 = 343° C. | T2 = 371° C. | T3 = 391° C. |
| % weight loss | 2.0 | 5.0 | 10.0 |

Example 6

Reaction of Diphenylethane with TBX-DB

The procedure of Example 1 was repeated, but using diphenylethane instead of toluene (10.9 g, 0.06 mol), TBX-DB (104.3 g, 0.18 mol), DCM (250 ml) and AlCl$_3$ (1.1 g, 0.09 mol). The weight of the product was 89.6 g. The content of bromine was about 66%.

Example 7

Reaction of Diphenyloxide with PBBBr and TBX-DB

The procedure of Example 5 was repeated, but using diphenyloxide instead of diphenylethane (8.5 g, 0.05 mol). The weight of the product was 115.1 g, corresponding to a ~96% yield. The content of bromine was about 75%.

Example 8

Reaction of Diphenylmethane with PBBBr and TBX-DB

The procedure of Example 5 was repeated, but using diphenylmethane instead of diphenylethane (8.4 g, 0.05 mol). The weight of the product was 113.0 g, corresponding to a ~94% yield. The content of bromine was about 75%.

In the studies reported in the following examples, the ability of bromine-containing polymers of the invention to reduce the flammability of different thermoplastic was evaluated. Test specimens were prepared and subjected to a flammability test according to the Underwriters-Laboratories standard UL 94, applying the vertical burn on specimens of 0.8, 1.6 mm or 3.2 mm thickness.

Examples 9 to 11

V-1 and V-0 Rated HIPS Formulations

In this set of examples, the compound of Formula III (the product of Examples 1 and 3) was tested to evaluate its ability to reduce the flammability of HIPS.

Ingredients Used to Prepare the Compositions

The materials employed in the experimental work are set out in Table 1 (the abbreviation "FR" indicates flame retardant):

TABLE 1

| Product (manufacturer) | description | function |
|---|---|---|
| Styron 1200 (Dow) | High impact polystyrene | plastic matrix |
| Product of Examples 1, 3 | [brominated polymer structure] | FR |
| AO 0112 (Kafrit) | Antimony trioxide masterbatch which contains 80% by weight Sb$_2$O$_3$ | FR-synergist |
| Hostaflon 2017 (Dyneon) | PTFE | Anti-dripping agent |
| Irganox B-225 (Ciba) | 50% tris(2,4-ditert-butylphenyl)phosphite and 50% pentaerythritol tetrakis[3-[3,5-di-tert-butyl-4-hydroxyphenyl]propiopnate] | Antioxidant & heat stabilizer |

Preparation of HIPS Compositions and Test Specimens

The ingredients were compounded in a twin-screw co-rotating extruder (Berstorff ZE25) with L/D=32. The polymer and the additives were weighed and mixed, and the resultant blend was fed directly to the extruder port. A set temperature profile of 80-180-190-200-200-200-210-220° C. was employed. The screw speed was 350 rpm, and the feeding rate was 15 kg per hour.

The extrudates obtained were pelletized in pelletizer 750/3 (Accrapac Systems Limited). The resultant pellets were dried in a circulating air oven at 75° C. for four hours.

The dried pellets were injection molded into test specimens using Allrounder 500-150 (Arburg). The conditions of the injection molding are set out in Table 2.

TABLE 2

| PARAMETER | UNITS | Set values |
|---|---|---|
| $T_1$ (Feeding zone) | ° C. | 200 |
| $T_2$ | ° C. | 205 |
| $T_3$ | ° C. | 210 |
| $T_4$ | ° C. | 215 |
| $T_5$ (nozzle) | ° C. | 220 |
| Mold temperature | ° C. | 30 |
| Injection pressure | bar | 1200 |
| Holding pressure | bar | 600 |
| Back pressure | bar | 50 |
| Holding time | sec | 7 |
| Cooling time | sec | 18 |
| Filling volume (portion) | ccm | 38 |
| Injection speed | ccm/sec | 35 |
| Switch over point | [ccm] | 12 |

The specimens produced were conditioned at 23° C. for one week and were then subjected to the flammability test. The compositions produced and the results of the tests are set out in Table 3.

TABLE 3

| | Example | | |
|---|---|---|---|
| | 9 | 10 | 11 |
| Composition (by weight %) | | | |
| HIPS | 82.2 | 83.325 | 81.575 |
| FR: Compound of Formula III | 12.5 | 13.75 | 16.25 |
| $Sb_2O_3$ (as M-0112; containing 80% $Sb_2O_3$) | 5 | 2.625 | 1.875 |
| PTFE | 0.1 | 0.1 | 0.1 |

TABLE 3-continued

| | Example | | |
|---|---|---|---|
| | 9 | 10 | 11 |
| Composition (by weight %) | | | |
| Irganox B 225 | 0.2 | 0.2 | 0.2 |
| Bromine content, % calculated | 9 | 10 | 11.7 |
| Antimony trioxide, % calculated | 4.0 | 2.1 | 1.5 |
| Properties | | | |
| Flammability test: UL-94 vertical burning test at 1.6 mm thickness | | | |
| Maximal flaming time (sec) | 1 | 8 | 9 |
| Total Flaming time (sec) | 10 | 24 | 46 |
| glowing + second flaming time (sec) | 50 | 6 | 0 |
| Number of Specimens dripped | 0 | 0 | 0 |
| Number of cotton ignition | 0 | 0 | 0 |
| Rating | V-1 | V-0 | V-0 |

The results indicate that UL-94 V-0 rating in HIPS is attainable with the aid of the product of Examples 1 or 3, with modest bromine content and low antimony trioxide loading in the HIPS composition.

Examples 12 and 13

V-1 and V-0 Rated ABS Formulations

In this set of examples, the compound of Formula V (the product of Example 5) was tested to evaluate its ability to reduce the flammability of ABS.

Ingredients Used to Prepare the Compositions

The materials employed in the experimental work are set out in Table 1 (the abbreviation "FR" indicates flame retardant):

TABLE 4

| Product (manufacturer) | description | function |
|---|---|---|
| ABS Magnum 3404 (Styron) | Acrylonitrile-butadiene-styrene copolymer | plastic matrix |
| Product of Example 5 | 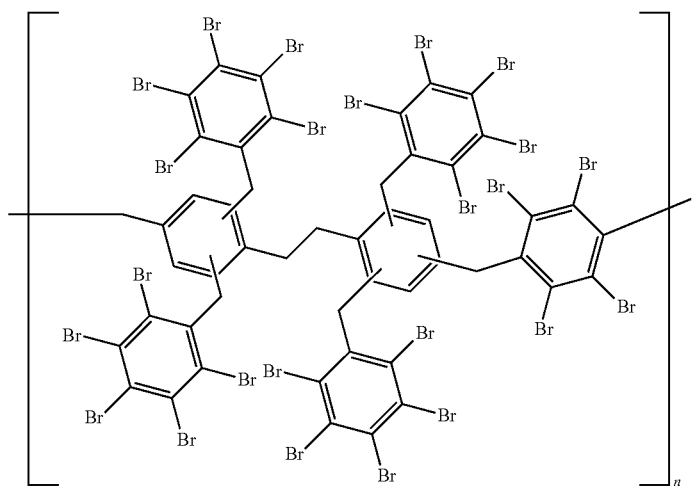 | FR |
| AO 0112 (Kafrit) | Antimony trioxide masterbatch which contains 80% by weight $Sb_2O_3$ | FR-synergist |
| Hostaflon 2017 (Dyneon) | PTFE | Anti-dripping agent |
| Irganox B-225 (Ciba) | 50% tris(2,4-ditert-butylphenyl)phosphite and 50% pentaerythritol tetrakis[3-[3,5-di- | Antioxidant & heat stabilizer |

| Product (manufacturer) description | function |
|---|---|
| tert-butyl-4-hydroxyphenyl]propiopnate] | |

Preparation of ABS Compositions and Test Specimens

The ingredients were compounded in a twin-screw co-rotating extruder (Berstorff ZE25) with L/D=32. The polymer and the additives were weighed and mixed, and the resultant blend was fed directly to the extruder port. A set temperature profile of 160-180-210-210-210-210-220-230° C. was employed. The screw speed was 350 rpm, and the feeding rate was 12 kg per hour.

The extrudates obtained were pelletized in pelletizer 750/3 (Accrapac Systems Limited). The resultant pellets were dried in a circulating air oven at 80° C. for three hours.

The dried pellets were injection molded into test specimens using Allrounder 500-150 (Arburg). The conditions of the injection molding are set out in Table 5.

TABLE 5

| PARAMETER | UNITS | Set values |
|---|---|---|
| $T_1$ (Feeding zone) | ° C. | 210 |
| $T_2$ | ° C. | 215 |
| $T_3$ | ° C. | 220 |
| $T_4$ | ° C. | 225 |
| $T_5$ (nozzle) | ° C. | 230 |
| Mold temperature | ° C. | 40 |
| Injection pressure | bar | 1200 |
| Holding pressure | bar | 800 |
| Back pressure | bar | 50 |
| Holding time | sec | 7 |
| Cooling time | sec | 18 |
| Filling volume (portion) | ccm | 37.5 |
| Injection speed | ccm/sec | 30 |
| Switch over point | [ccm] | 12 |

The specimens produced were conditioned at 23° C. for one week and were then subjected to the flammability test. The compositions produced and the results of the tests are set out in Table 6.

TABLE 6

| | Example | |
|---|---|---|
| | 12 | 13 |
| Composition (% by weight) | | |
| ABS | 81.4 | 80.5 |
| product of Example 5 | 13.3 | 17.3 |
| $Sb_2O_3$ (as M-0112; containing 80% $Sb_2O_3$) | 5.0 | 1.9 |
| PTFE | 0.1 | 0.1 |
| Irganox B 225 | 0.2 | 0.2 |
| Bromine content, % calculated | 10.0 | 13.0 |
| Antimony trioxide, % calculated | 4.0 | 1.5 |
| Properties | | |
| Flammability test: UL-94 vertical burning test at 1.6 mm thickness | | |
| Maximal flaming time (sec) | 1 | 6 |
| Total Flaming time (sec) | 10 | 21 |
| Maximal glow time + second flaming | 30 | 2 |
| Number of Specimens dripped | 0 | 0 |
| Number of cotton ignition | 0 | 0 |
| Number of Specimens burning up to the clamps | 0 | 0 |
| Rating | V-0 | V-0 |

The results show that UL-94 V-0 rating in ABS is attainable with the aid of a combination consisting of the product of Example 5 and antimony trioxide. The loading of the bromine-containing flame retardant and the antimony trioxide is fairly reasonable, and the UL-94 V-0 rating is achieved across a wide range of bromine: $Sb_2O_3$ weight ratio.

The invention claimed is:

1. A process for preparing bromine-containing polymer, comprising a Friedel-Crafts alkylation reaction of tetrabromoxylylene dihalide, or tetrabromoxylylene dihalide in combination with pentabromobenzyl halide, with a reactant having one or more six-membered aromatic rings of Formula (II):

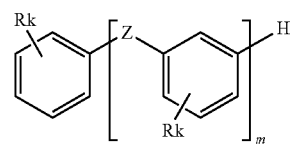

where R is a linear or branched aliphatic chain; k is an integer from 0 to 3; m is 0 or 1; and Z is selected from the group consisting of null, O, S and a linear or branched alkylene, wherein the reaction takes place in a solvent in the presence of a Friedel-Crafts catalyst, and isolating from the reaction mixture the bromine-containing polymer of Formula (I):

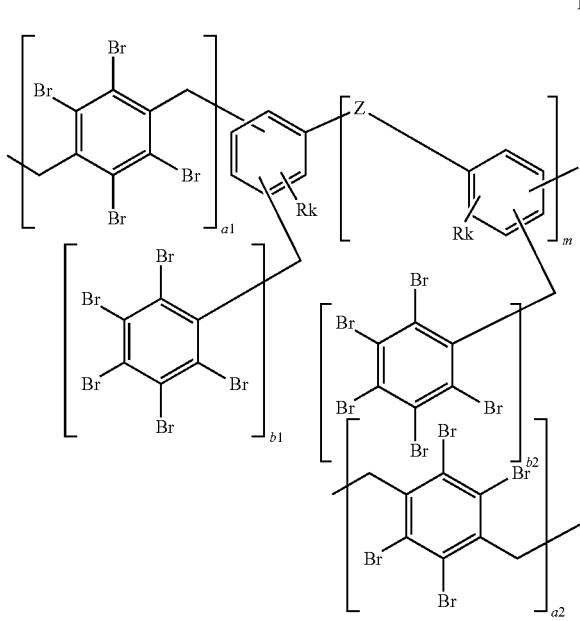

wherein R, k, m, and Z are as defined above; each of a1 and a2 is independently an integer from 1 to 3; and each of b1 and b2 is independently an integer from 1 to 3, such that a1+b1≤3 and a2+b2≤3.

2. A process according to claim 1, wherein a combination of tetrabromoxylylene dihalide and pentabromobenzyl halide is used.

3. A process according to claim 1, wherein the tetrabromoxylylene dihalide is tetrabromo-para-xylylene dibromide and the pentabromobenzyl halide is pentabromobenzyl bromide.

4. A process according to claim 1, wherein the reactant is a compound of Formula II selected from the group consisting of:
- toluene, where in Formula II, R=CH$_3$, k=1, m=0;
- xylene, where in Formula II, R=CH$_3$, k=2, m=0;
- ethylbenzene, where in Formula II, R=C$_2$H$_5$, k=1, m=0;
- diphenyl ether, where in Formula II, k=0, Z=O, m=1;
- diphenylmethane, where in Formula II, k=0, Z=—CH$_2$—, m=1; and
- 1,2-diphenylethane, wherein in Formula II, k=0, Z=—(CH$_2$)$_2$—, m=1.

5. A process according to claim 4, comprising reacting toluene with tetrabromo-para-xylylene dibromide and pentabromobenzyl bromide in halogenated aliphatic hydrocarbon solvent to give a bromine-containing polymer comprising chains of Formula III (where n indicates the number of repeat units):

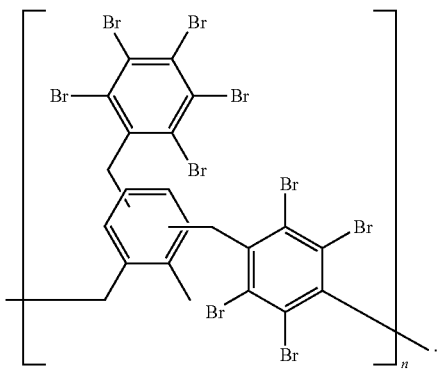

III

6. A process according to claim 4, comprising reacting 1,2-diphenylethane with tetrabromo-para-xylylene dibromide and pentabromobenzyl bromide in halogenated aliphatic hydrocarbon solvent to give a bromine-containing polymer comprising chains of Formula V (wherein n indicates the number of repeat units):

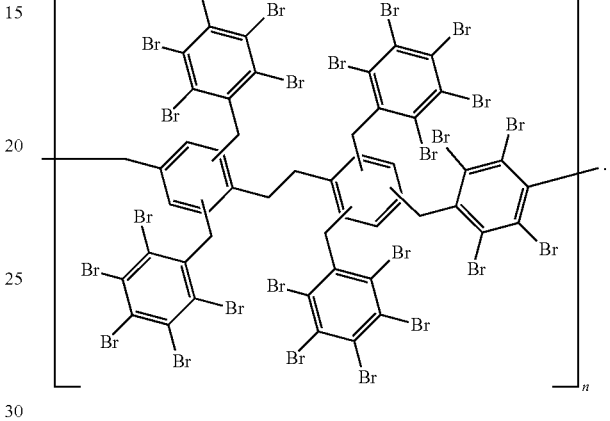

V

* * * * *